US007230668B2

United States Patent
Lee et al.

(10) Patent No.: US 7,230,668 B2
(45) Date of Patent: Jun. 12, 2007

(54) REFLECTION TYPE LIQUID CRYSTAL DISPLAY DEVICE WITH A PASSIVATION LAYER DIRECTLY ON THE PAD ELECTRODE

(75) Inventors: Jeong-Ho Lee, Seoul (KR); Sang-Gun Choi, Suwon-si (KR); Young-Goo Song, Suwon-si (KR)

(73) Assignee: Samsung Electronics Co., Inc. (KR)

( * ) Notice: Subject to any disclaimer, the term of this patent is extended or adjusted under 35 U.S.C. 154(b) by 0 days.

(21) Appl. No.: 10/498,915

(22) PCT Filed: Aug. 9, 2002

(86) PCT No.: PCT/KR02/01525

§ 371 (c)(1),
(2), (4) Date: Jun. 15, 2004

(87) PCT Pub. No.: WO03/058332

PCT Pub. Date: Jul. 17, 2003

(65) Prior Publication Data

US 2005/0088591 A1    Apr. 28, 2005

(30) Foreign Application Priority Data

Jan. 14, 2002  (KR) ................. 2002-1959

(51) Int. Cl.
*G02F 1/1345* (2006.01)
(52) U.S. Cl. ...................... 349/152; 349/149; 349/138
(58) Field of Classification Search ................ 349/149, 349/152, 113
See application file for complete search history.

(56) References Cited

U.S. PATENT DOCUMENTS 5,581,382 A * 12/1996 Kim ............................ 349/42
5,731,856 A    3/1998 Kim et al. .................... 349/43
5,982,467 A   11/1999 Lee ............................. 349/138

FOREIGN PATENT DOCUMENTS

EP        0 782 040 A2    7/1997

* cited by examiner

*Primary Examiner*—Andrew Schechter
*Assistant Examiner*—Lucy Chien
(74) *Attorney, Agent, or Firm*—MacPherson Kwok Chen & Heid LLP; David S. Park

(57) ABSTRACT

Disclosed are a reflection type LCD and method of manufacturing the same. A wiring layer having a first and second metal layer (102, 104) is formed on a substrate (100) including a display region (D) and a pad region (P). Upon the substrate (100) and the wiring layer is formed a first passivation layer (155), and contacts with a wiring terminal (115) and the first metal layer (102). A second passivation layer (180) is formed on the substrate except the pad region (P). The pad contact hole (160) extends to a position under the second passivation layer (180). The second passivation layer (180) covers a region in the pad contact hole (160) where the step coverage of the pad electrode (170) is poor, thereby preventing a battery effect.

22 Claims, 16 Drawing Sheets

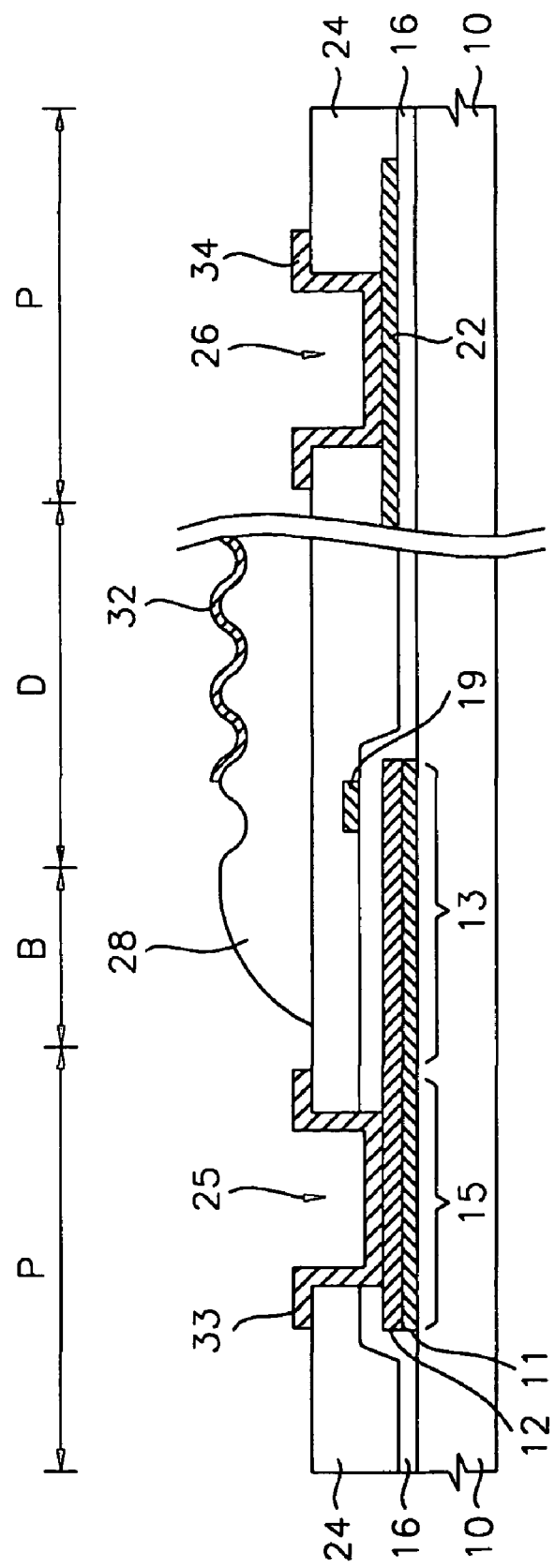

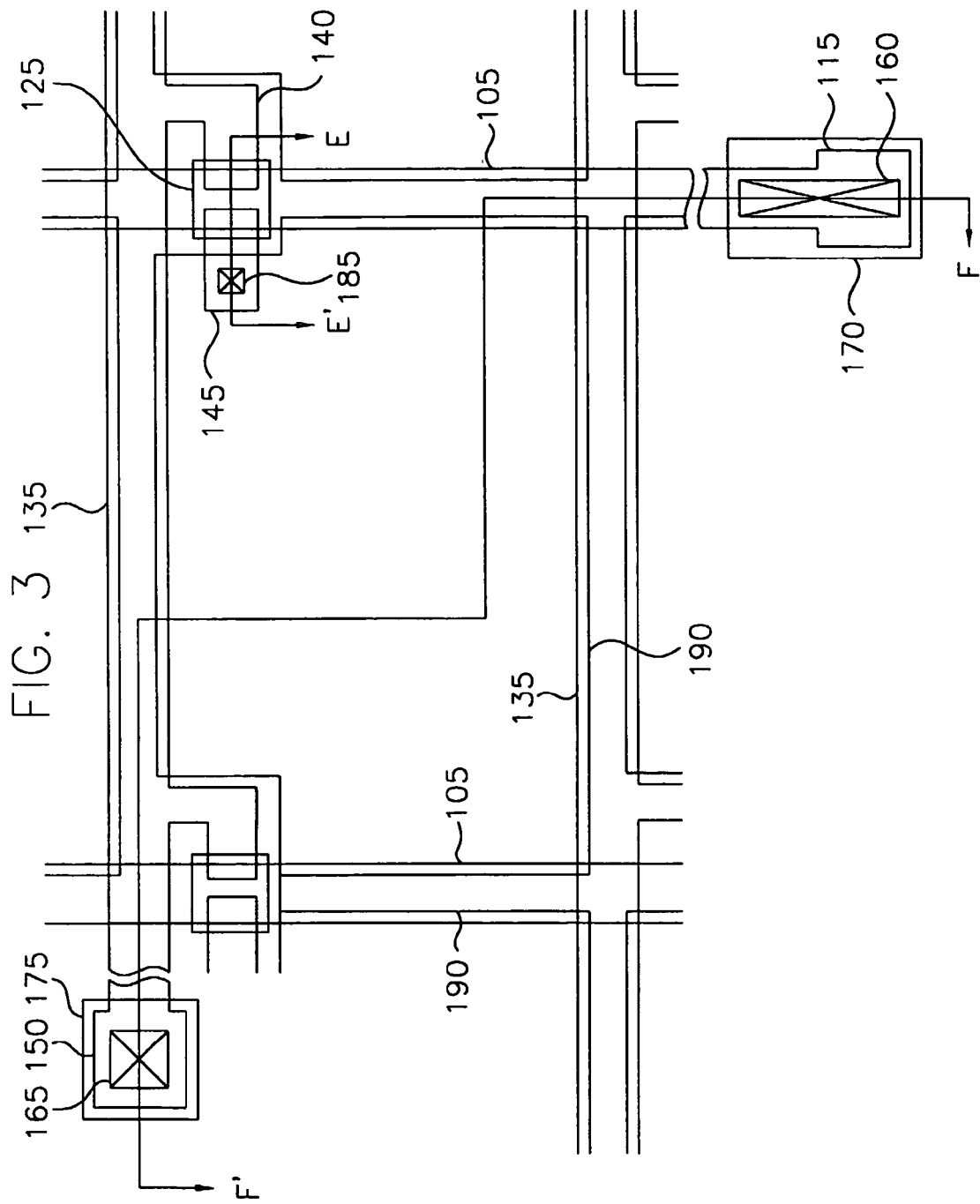

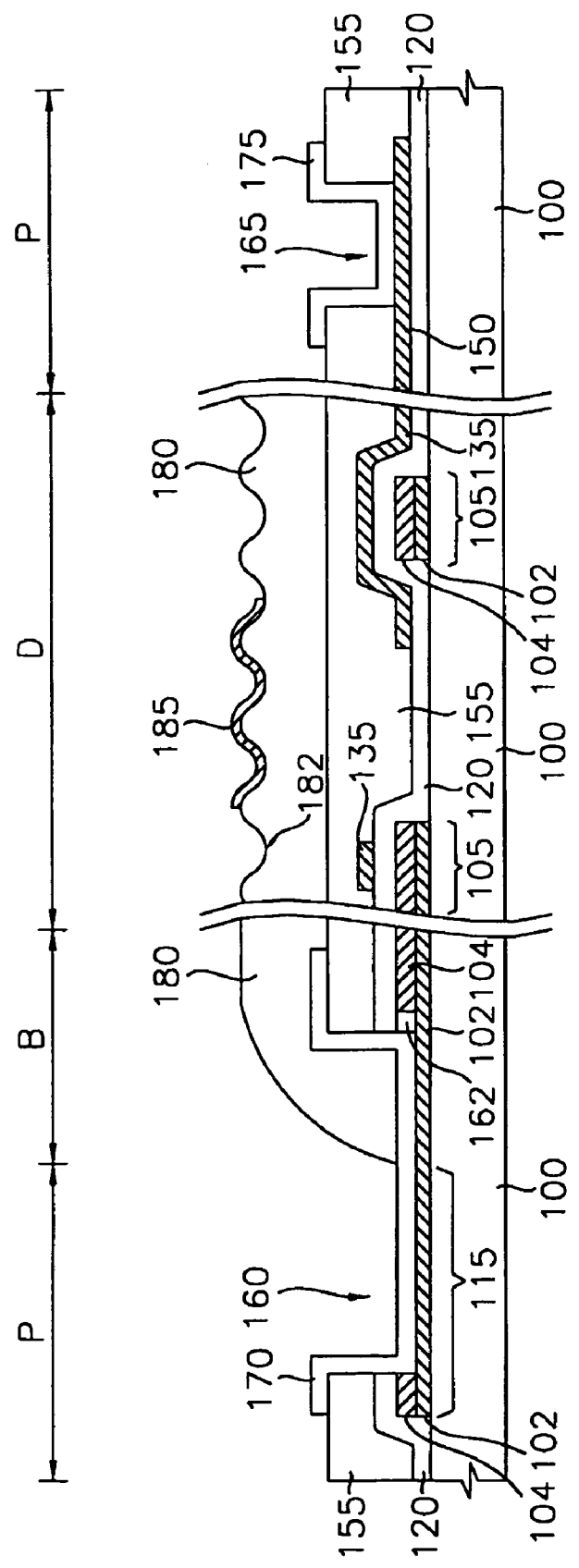

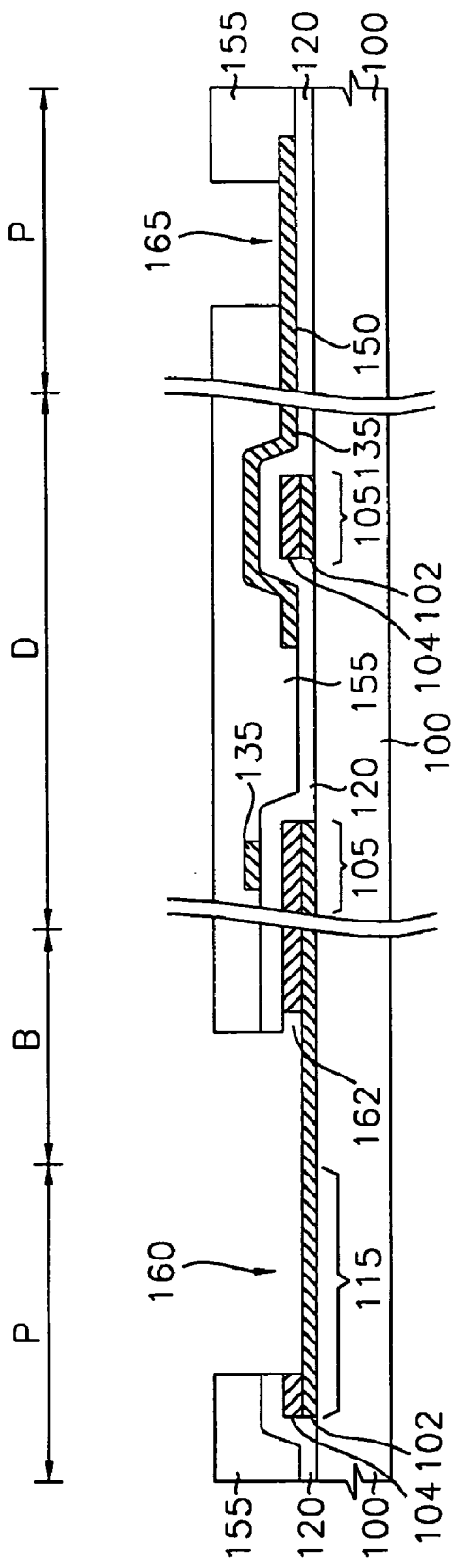

REFLECTION TYPE LIQUID CRYSTAL DISPLAY DEVICE WITH A PASSIVATION LAYER DIRECTLY ON THE PAD ELECTRODE

TECHNICAL FIELD

The present invention relates to a liquid crystal display device and a method of manufacturing the same, and more particularly to a reflection type liquid crystal display device and a method of manufacturing the same in which a battery effect can be prevented when a pad electrode consisting of a transparent conductive layer is used.

BACKGROUND ART

In the information society of these days, electronic display devices are more important as information transmission media and various electronic display devices are widely applied for industrial apparatus or home appliances. Such electronic display devices are being continuously improved to have new appropriate functions for various demands of the information society.

In general, electronic display devices display and transmit various pieces of information to users who utilize such information. That is, the electronic display devices convert electric information signals outputted from electronic apparatus into light information signals recognized by users through their eyes.

In the electronic display devices dividing into an emissive display device and a non-emissive display device, the emissive display device displays light information signals through a light emission phenomena thereof and the non-emissive display device displays the light information signals through a reflection, a scattering or an interference thereof. The emissive display device includes a cathode ray tube (CRT), a plasma display panel (PDP), a light emitting diode (LED) and an electroluminescent display (ELD). The emissive display device is called as an active display device. Also, the non-emissive display device, called as a passive display device, includes a liquid crystal display (LCD), an electrochemical display (ECD) and an electrophoretic image display (EPID).

The CRT has been used for a television receiver or a monitor of a computer as the display device for a long time since it has a high quality and a low manufacturing cost. The CRT, however, has some disadvantages such as a heavy weight, a large volume and high power dissipation.

Recently, the demand for a new electronic display devices is greatly increased such as a flat panel display device having excellent characteristics that thin thickness, light weight, low driving voltage and low power consumption. Such flat panel display devices can be manufactured according to the rapidly improved semiconductor technology.

In the flat panel devices, a liquid crystal display (LCD) device has been widely utilized for various electronic devices because the LCD device has thin thickness, low power dissipation and high display quality approximately identical to those of the CRT. Also, the LCD device can be operated under a low driving voltage and can be easily manufactured so that the LCD device is widely used for various electronic apparatuses.

The LCD devices are generally divided into a transmission type LCD device, a reflection type LCD device and a reflection-transmission type LCD device. The transmission type LCD device displays information by using a light source such as a backlight and the reflection type LCD device displays information by using an external natural light. The reflection-transmission type LCD device operates in a transmission mode for displaying an image using a built-in light source of the LCD device in a room or in a dark place where an external light source does not exist, and operates in a reflection mode for displaying the image by reflecting an incident light in the outside.

At present, a thin film transistor-liquid crystal display device (TFT-LCD) is predominantly used. The thin film transistor-liquid crystal display device has a structure that two substrates respectively having electrodes are provided and a thin film transistor (TFT) for switching a voltage applied to the electrodes is generally formed in a pixel region of one of the substrates. The thin film transistor-liquid crystal display devices are divided into an amorphous typed TFT-LCD and a polycrystalline typed TFT-LCD.

FIGS. 1A and 1B are cross-sectional views showing a reflection type liquid crystal display device according to a conventional method. In FIGS. 1A and 1B, the reflection type liquid crystal display device is an amorphous silicon TFT-LCD having a bottom-gate structure. Referring to FIG. 1B, a reference symbol P shows a pad region; a reference symbol D indicates a display region; and a reference symbol B shows a boundary region located between the pad region and the display region.

Referring to FIGS. 1A and 1B, after sequentially depositing a chrome (Cr) layer 11 and an aluminum-neodymium (AlNd) layer 12 on a substrate 10 composed of an insulating material such as glass, quartz or sapphire, these layers are patterned by a photolithography process to form a gate wiring. The gate wiring includes a gate line 13 prolonged in a first direction, a gate electrode 12 of a thin film transistor branched from the gate line 13 and a gate terminal 15 connected to the end of the gate line 13.

A gate insulation layer 16 composed of silicon nitride is formed on the substrate 10 on which the gate wiring is formed, and then, an amorphous silicon layer and an n$^+$ doped amorphous silicon layer are successively deposited on the gate insulation layer 16. Subsequently, the amorphous silicon layer and the n$^+$ doped amorphous silicon layer are patterned via a photolithography process to form an active pattern 17 and an ohmic contact pattern 18. Thus, the active pattern 17 is composed of amorphous silicon and the ohmic contact pattern 18 is made of n$^+$ doped amorphous silicon.

After depositing a second metal layer, e.g., chrome (Cr) layer, on the ohmic contact pattern 18 and the gate insulation layer 16, the second metal layer is patterned through a photolithography process to form a data wiring. The data wiring includes a data line 19 prolonged in a second direction perpendicular to the first direction, source/drain electrodes 20 and 21 branched from the data line 19 and a data terminal 22 connected to the end of the data line 19.

Then, a portion of the ohmic contact pattern 18 exposed between the source electrode 20 and the drain electrode 22 is dry-etched away to complete the thin film transistor.

After forming an inorganic passivation layer 24 comprised of silicon nitride on the data wiring and the gate insulation layer 16, a portion of the inorganic passivation layer 24 over the drain electrode 21 is removed. At the same time, there are formed a first pad contact hole 25 for exposing the gate terminal 15 and a second pad contact hole 26 for exposing the data terminal 22.

After forming an organic passivation layer 26 on the entire surface of the resultant structure, a portion the organic passivation layer 26 over the drain electrode 22 and the pad regions is removed by exposure and development processes to form a contact hole 29 exposing the drain electrode 22. At the same time, numerous grooves 30 for scattering a light are formed at the surface of the organic passivation layer 26.

After depositing a reflective layer composed of metal having high reflectivity such as aluminum-neodymium (AlNd) on the entire surface of the resultant structure, the reflective layer is patterned by a photolithography process to form a reflective electrode 32 connected to the drain electrode 21 through the contact hole 29. At the same time, there are formed a gate pad electrode 33 connected to the gate terminal 15 through the first pad contact hole 25 for applying a scanning voltage to the gate electrode 14 and a data pad electrode 34 connected to the data terminal 22 through the second pad contact hole 26 for applying a signal voltage to the source electrode 20.

According to the above conventional reflection type liquid crystal display device, the pad electrodes 33 and 34 are simultaneously formed when forming the reflective electrode 32 composed of aluminum alloy such as aluminum-neodymium (AlNd). Thus, during a subsequent chip on glass (COG) bonding process by which integrated circuits are directly mounted on the substrate of the LCD panel, COG (chip on glass) block defects may be caused due to aluminum corrosion. Therefore, there is suggested a method where a pad electrode is formed of an indium-tin-oxide (ITO) used as a transparent electrode.

FIG. 2 is a cross-sectional view of a reflection type liquid crystal display device manufactured by another conventional method. Here, a reference symbol P shows a pad region; a reference symbol D indicated a display region; and a reference symbol B shows a boundary region located between the pad region and the display region.

Referring to FIG. 2, after sequentially depositing a chrome (Cr) layer 51 and an aluminum-neodymium (AlNd) layer 52 on a substrate 50 composed of an insulating material such as glass, these layers are patterned by a photolithography process to form a gate wiring. The gate wiring includes a gate line 53 prolonged in a first direction, a gate electrode (not shown) branched from the gate line 53 and a gate terminal 54 connected to the end of the gate line 53.

A gate insulation layer 55 composed of silicon nitride is formed on the substrate 50 on which the gate wiring is formed. Then, an active pattern (not shown) composed of amorphous silicon and an ohmic contact pattern (not shown) composed of n⁺ doped amorphous silicon are successively formed on the gate insulation layer 55.

After depositing a second metal layer, e.g., a chrome (Cr) layer, on the ohmic contact pattern and the gate insulation layer 55, the second metal layer is patterned by a photolithography process to form a data wiring. The data wiring includes a data line 56 prolonged in a second direction perpendicular to the first direction, source/drain electrodes (not shown) branched from the data line 56 and a data terminal 58 connected to the end of the data line 56. Successively, a portion of the ohmic contact pattern exposed between the source electrode and the drain electrode is dry-etched away.

After forming an inorganic passivation layer 60 on the data wiring and the gate insulation layer 55, a portion of the inorganic passivation layer 60 over the drain electrode is removed by a photolithography process. At the same time, there are formed a first pad contact hole 61 exposing the gate terminal 54 and a second pad contact hole 62 exposing the data terminal 58. In general, ITO and Al cannot be in contact with each other due to a galvanic corrosion. Thus, during the formation of the pad contact holes 61 and 62, the entire exposed AlNd layer 52 of the gate terminal 54 is etched away using a wet etching process. By doing so, an ITO pad electrode being formed in a subsequent process is in contact with the Cr layer 51 of the gate terminal 54. However, when the AlNd layer 52 exposed through the first pad contact hole 61 is etched away, the side of the AlNd layer 52 is etched away due to the isotropic property of wet etching to thereby generate an undercut 64.

Next, an ITO layer is deposited on the pad contact holes 61 and 62 and the inorganic passivation layer 60 and then, patterned by a photolithography process to thereby form a gate pad electrode 65 and a data pad electrode 66. The gate pad electrode 65 is connected to the gate terminal 54 through the first pad contact hole 61 and the data pad electrode 66 is connected to the data terminal 58 through the second pad contact hole 62. At this time, step coverage of the date pad electrode 65 becomes poor on a stepped portion in the first pad contact hole 61, i.e., the undercut region 64.

After forming an organic passivation layer 68 on the pad electrodes 65 and 66 and the inorganic passivation layer 60, the organic passivation layer 68 is patterned by an exposure process and a development process to thereby form a contact hole (not shown) for exposing the drain electrode. At the same time, numerous grooves 69 are formed in the surface of the organic passivation layer over the display region.

After sequentially depositing a barrier metal layer 70 composed of molybdenum-tungsten (MoW) and a reflective layer composed of aluminum-neodymium (AlNd) on the contact hole and the organic passivation layer 68, the reflective layer and the barrier metal layer 70 are patterned by a photolithography process to thereby form a reflective electrode 72 connected to the drain electrode through the contact hole.

According to the above conventional method, in order to prevent the galvanic corrosion caused between ITO and Al, the entire AlNd layer 52 of the gate terminal 54 is etched away using a wet etching process when the pad contact holes 61 and 62 are formed. Thus, the undercut 64 is generated in the AlNd layer 52.

Further, two photolithography processes for forming the organic passivation layer 68 and the reflective electrode 72 are carried out after the pad electrodes 65 and 66 are formed. Moreover, in order to improve the pixel contact characteristics, an etching process using an aluminum etchant is added before forming the reflective electrode 72. Accordingly, during performing the above processes, chemicals such as a develop solution or an etchant penetrate through the stepped portion (portion "A" in FIG. 2) in the first pad contact hole 61 to thereby corrode the AlNd layer 52. In addition, such chemicals serve as an electrolyte to cause a battery effect between Al and ITO, thereby generating a lifting of the gate pad electrode 61.

DISCLOSURE OF THE INVENTION

The present invention has been made to solve the aforementioned problem, and accordingly, it is an object of the present invention to provide a reflection type liquid crystal display device in which a battery effect can be prevented when a pad electrode consisting of a transparent conductive layer is used.

It is another object of the present invention to provide a method of manufacturing a reflection type liquid crystal display device in which a battery effect can be prevented when a pad electrode consisting of a transparent conductive layer is used.

To achieve the object of the present invention, there is provided a reflection type liquid crystal display device comprising a substrate including a display region and a pad region located outside the display region, a wiring layer formed on the substrate, the wiring layer being comprised of a first metal layer and a second metal layer stacked on the first metal layer and including a wiring layer terminal located on the pad region; a first passivation layer formed on the substrate and the wiring layer and having a pad contact hole for exposing the wiring layer terminal and the first metal layer of a portion of the wiring layer connected to the wiring layer terminal; a pad electrode continuously formed on the sidewall and bottom of the pad contact hole and on a portion of the first passivation layer, the pad electrode being comprised of a transparent conductive layer and making contact with the wiring terminal and the first metal layer of a portion of the wiring layer connected to the wiring layer terminal; a second passivation layer formed on the substrate except the pad region; and a reflective electrode formed on the second passivation layer of the display region, wherein the pad contact hole is extended to a position under the second passivation layer located on a boundary region between the display region and the pad region.

Further, to achieve the above object of the present invention, there is provided a reflection type liquid crystal display device comprising a substrate including a display region and a pad region located outside the display region; a gate wiring formed on the substrate, the gate wiring being comprised of a first metal layer and a second metal layer stacked on the first metal layer and including a gate line prolonged in a first direction and a gate terminal formed on the pad region and connected to the end of the gate line; a gate insulating layer formed on the gate wiring and the substrate; a data wiring formed on the gate insulating layer, the data wiring including a data line prolonged in a second direction perpendicular to the first direction and a data terminal formed on the pad region so as to be connected to the end of the data line; a first passivation layer formed on the data wiring and the gate insulating layer, the first passivation layer having a first pad contact hole formed through the gate insulating layer to expose the gate terminal and the first metal layer that is a portion of the gate line connected to the gate terminal; a gate pad electrode continuously formed on the sidewall and bottom of the first pad contact hole and on a portion of the first passivation layer, the gate pad electrode consisting of a transparent conductive layer and being in contact with the gate terminal and the first metal layer of a portion of the gate line connected to the gate wiring; a second passivation layer formed on the substrate except the pad region; and a reflective electrode formed on the second passivation layer of the display region, wherein the first pad contact hole is extended to a position under the second passivation layer located on a boundary region between the display region and the pad region.

To achieve another object of the present invention, there is provided a method of manufacturing a reflection type liquid crystal display device comprising the steps of forming a wiring layer on a substrate including a display region and a pad region located outside the display region, the wiring layer being comprised of a first metal layer and a second metal layer stacked on the first metal layer and including a wiring layer terminal located on the pad region; forming a first passivation layer on the substrate and the wiring layer, the first passivation layer having a pad contact hole for exposing the wiring layer terminal and the first metal layer of a portion of the wiring layer connected to the wiring layer terminal; continuously forming a pad electrode comprised of a transparent conductive layer on the sidewall and bottom of the pad contact hole and on a portion of the first passivation layer, the pad electrode making contact with the wiring terminal and the first metal layer of a portion of the wiring layer connected to the wiring layer terminal; forming a second passivation layer on the substrate except the pad region; and forming a reflective electrode on the second passivation layer in the display region.

Further, to achieve anther object of the present invention, there is provided a method of manufacturing a reflection type liquid crystal display device comprising the steps of forming a gate wiring on a substrate including a display region and a pad region located outside the display region, the gate wiring being comprised of a first metal layer and a second metal layer stacked on the first metal layer and including a gate line prolonged in a first direction and a gate terminal formed on the pad region and connected to the end of the gate line; forming a gate insulating layer on the gate wiring and the substrate; forming a data wiring on the gate insulating layer, the data wiring including a data line prolonged in a second direction perpendicular to the first direction and a data terminal formed on the pad region so as to be connected to the end of the data line; forming a first passivation layer on the data wiring and the gate insulating layer, the first passivation layer having a first pad contact hole formed through the gate insulating layer to expose the gate terminal and the first metal layer of a portion of the gate line connected to the gate terminal; continuously forming a gate pad electrode comprised of a transparent conductive layer on the sidewall and bottom of the first pad contact hole and on a portion of the first passivation layer, the gate pad electrode being in contact with the gate terminal and the first metal layer of a portion of the gate line connected to the gate wiring; forming a second passivation layer on the substrate except the pad region; and forming a reflective electrode on the second passivation layer in the display region.

According to the present invention, the pad electrode comprised of the transparent conductive layer is formed after an opening region of the first passivation layer, i.e., the pad contact hole, is formed so as to be extended to a position under the second passivation layer located on the boundary region between the display region and the pad region. Thus, the second passivation layer covers a portion where step coverage of the pad electrode is poor due to a stepped portion of the opening region, i.e., an undercut of the second metal layer. Therefore, it can be prevented chemicals from penetrating through the stepped portion of the opening region to cause the battery effect between the pad electrode and the second metal layer of the wiring layer, thereby preventing a lifting of the pad electrode and a corrosion of the second metal layer.

Further, the first metal layer of the wiring layer exposed through the pad contact hole is covered with the pad electrode to the boundary region located between the display region and the pad region. Thus, when the first metal layer of the wiring layer terminal is short-circuited on a predetermined region, a redundancy can be formed by the pad electrode covering the first metal layer that is not short-circuited.

BRIEF DESCRIPTION OF DRAWINGS

The above and other objects and advantages of the present invention will become readily apparent by reference to the following detailed description when considered in conjunction with the accompanying drawings wherein:

FIGS. 1A and 1B are cross-sectional views showing a reflection type liquid crystal display device manufactured according to one conventional method;

FIG. 3 is a plan view showing a reflection type liquid crystal display device according to a present invention;

FIGS. 4A and 4B are cross-sectional views showing the reflection type liquid crystal display device, taken along lines E-E' and F-F' in FIG. 3.

BEST MODE FOR CARRYING OUT THE INVENTION

Hereinafter, a reflection type liquid crystal display device and a method of manufacturing the reflection type liquid crystal display device according to the preferred embodiments of the present invention will be described in detail with reference to the accompanying drawings.

Figure 1A:
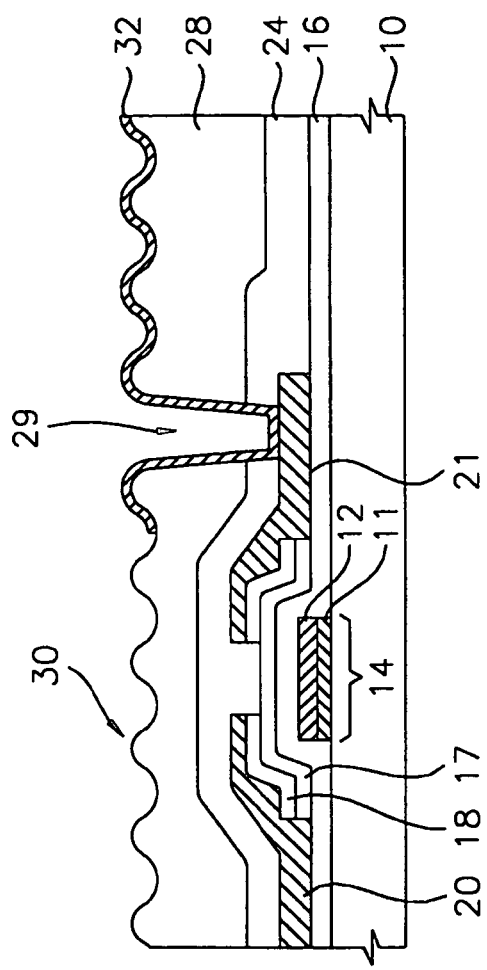
Figure 2:
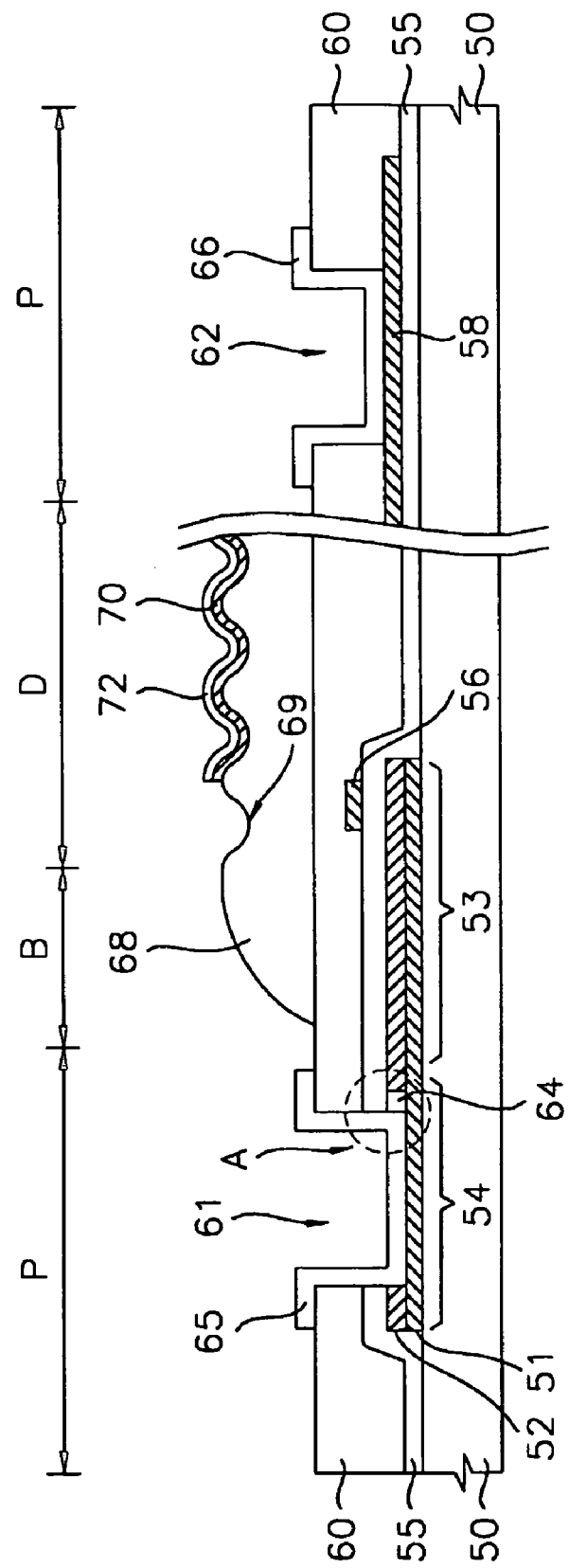
FIG. 2 is a cross-sectional view illustrating a reflection type liquid crystal display device manufactured by another conventional method.
Figure 4A:
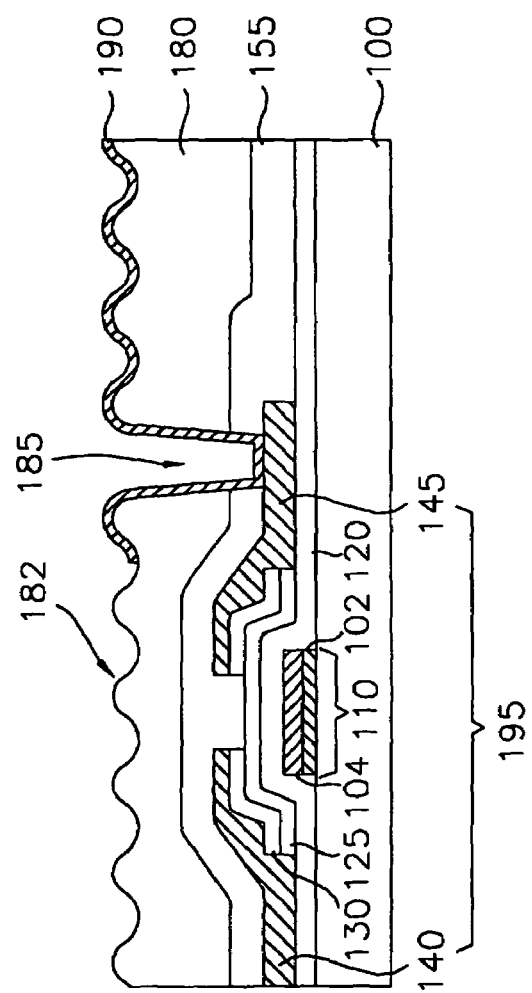

FIG. 3 is a plan view showing a reflection type liquid crystal display device according to the present invention. FIGS. 4A and 4B are cross-sectional views of the reflection type liquid crystal display device, taken along lines E-E' and F-F' in FIG. 3, respectively. The reflection type liquid crystal display device includes an amorphous silicon thin film transistor having a bottom-gate structure. Here, a reference symbol P shows a pad region; a reference symbol D indicated a display region; and a reference symbol B shows a boundary region located between the pad region and the display region. Here, the pad region P is formed outside the display region D so as to surround the display region D.

Referring to FIGS. 3, 4A and 4B, a gate wiring is formed on a substrate 100 made of an insulating material such as glass, quartz or sapphire. The gate wiring is comprised of double metal layers including a first metal layer 102 consisting of chrome (Cr), molybdenum (Mo), tantalum (Ta) or a titanium (Ti) and a second metal layer 104 consisting of aluminum alloy such as aluminum (Al) or aluminum-neodymium (AlNd) stacked on the first metal layer 102. The gate wiring includes a gate line 105 prolonged in a first direction (i.e., a horizontal direction), a gate electrode 110 of a thin film transistor 195 branched from the gate line 105, and a gate terminal 115 formed on the pad region (P) and connected to the end of the gate line 115.

A gate insulation layer 120 is formed on the gate wiring and the substrate 100. The gate insulation layer 120 is comprised of an inorganic material such as silicon nitride. An active pattern 125 and an ohmic contact pattern 130 are successively formed on the gate insulation layer 120 where the gate electrode 110 is located. The active pattern 125 is comprised of amorphous silicon and the ohmic contact pattern 130 is comprised of $n^+$ doped amorphous silicon.

Further, a data wiring made of a single metal layer such as chrome (Cr) is formed on the gate insulation layer 120 and the ohmic contact pattern 130. The data wiring includes a data line 135 prolonged in a second direction (i.e., a vertical direction) perpendicular to the first direction, first and second electrodes 140 and 145, and a data terminal 150 formed on the pad region (P) so as to be connected to the end of the data line 135. The first electrode 140 (source electrode or drain electrode) is branched from the data line 135 and overlapped with a first region of the active pattern 125. The second electrode 145 (drain electrode or source electrode) is overlapped with a second region of the active pattern 125 opposed to the first region. Hereinafter, the first electrode 140 is called as the source electrode and the second electrode 145 is called as the drain electrode.

Upon the data wiring and the gate insulating layer 120, there is formed a first passivation layer 155 having a first pad contact hole 160 exposing the gate terminal 115 and a portion of the gate line 105 connected to the gate terminal 115 and a second pad contact hole 175 exposing the data terminal 150. Preferably, the first passivation layer 155 is comprised of an inorganic material such as silicon nitride. The first pad contact hole 160 is formed through the first passivation layer 155 and gate insulating layer 120 to thereby expose the gate terminal 115 and the first metal layer 102 that is a portion of the gate line 105 connected to the gate terminal 115.

A gate pad electrode 170 comprised of a transparent conductive layer, preferably ITO, is formed continuously on the sidewall and bottom of the first pad contact hole 160 and on a portion of the first passivation layer 155. Through the first pad contact hole 160, the gate pad electrode 170 makes contact with the gate terminal 115 and the first metal layer 102 that is a portion of the gate line 105 connected to the gate terminal 115 so as to apply a scanning voltage to the gate electrode 110. Further, a data pad electrode 175 made from the same layer as in the gate pad electrode 170 makes contact with the data terminal 150 through the second pad contact hole 165 so as to apply a signal voltage to the source electrode 140.

A second passivation layer 180 comprised of an organic material such as photosensitive acrylic resin is formed on the first passivation layer 155. In the display region (D) where pixels are formed to display an image, numerous grooves 30 for scattering a light to enhance the reflectivity are formed at the surface of the second passivation layer 180. The first passivation layer 155 comprised of an inorganic material is provided in order to maintain the reliability of the transistor and pads and to enhance the adhesion of a COG bonding. To achieve such purpose, the second passivation layer 180 comprised of an organic material is formed only on the region except the pad region (P).

On the second passivation layer 180, there is formed a reflective electrode 185 connected to the drain electrode 145 via a contact hole 185 formed through a first passivation layer 155 and the second passivation layer 180. The reflective electrode 185 severs as a reflector for reflecting a light being irradiated upon the substrate 100 from the outside and simultaneously, serves as a pixel electrode for receiving an image signal from the thin film transistors 195, which are formed on the respective pixel region of the substrate 100, to generate an electric field with an electrode (not shown) of an upper substrate (i.e., color filter substrate). The reflective electrode 185 is formed in the pixel region confined by the gate line 105 and the data line 135. Further, in order to secure a high aperture ratio, the edges of the reflective electrode 185 are overlapped with the gate line 105 and the data line 135. Though not shown in the figure, a barrier metal layer may be formed under the reflective electrode 185. The barrier metal layer is comprised of a metal having an etching rate similar to that of the reflective electrode 185 with respect to a predetermined etchant, and is preferably comprised of molybdenum-tungsten (MoW).

According to the reflection type liquid crystal display device of the present invention, an opening region of the first passivation layer 155, i.e., the first pad contact hole 160 is formed so as to be extended to be formed under the second passivation layer 155 located on the boundary region (B) between the display region (D) and the pad region (P). As a result, during subsequent processes after forming the pad electrodes 170 and 175, it can be prevented chemicals from penetrating through a region where step coverage of the gate pad electrode 170 is poor due to a stepped portion in the first pad contact hole 160 (i.e., an undercut 162 of the second metal layer 104), thereby preventing a battery effect caused between the gate pad electrode 170 and the second metal layer 104. Therefore, no defect such as a lifting of the gate pad electrode 175 and a corrosion of the second metal layer 104 is generated.

Further, according to the reflection type liquid crystal display device of the present invention, the first metal layer 102 exposed through the first pad contact hole 160 is covered with the gate pad electrode 170 to the boundary region (B). Therefore, when chemicals penetrate through pinholes in ITO layer constituting the gate pad electrode 170 to short-circuit the first metal layer 102 of the gate wiring, a redundancy can be formed of the gate pad electrode 170 covering the first metal layer 102 that is not short-circuited.

FIGS. 5A to 9B are cross-sectional views illustrating a method of manufacturing the reflection type liquid crystal display device shown in FIG. 4. Here, each of figures "a" are cross-sectional views taken along a line E-E' in FIG. 3, while each of figures "b" taken along a line F-F' in FIG. 3. A reference symbol P shows a pad region; a reference symbol D indicates a display region; and a reference symbol B shows a boundary region located between the display region and the pad region.

Figure 5A:
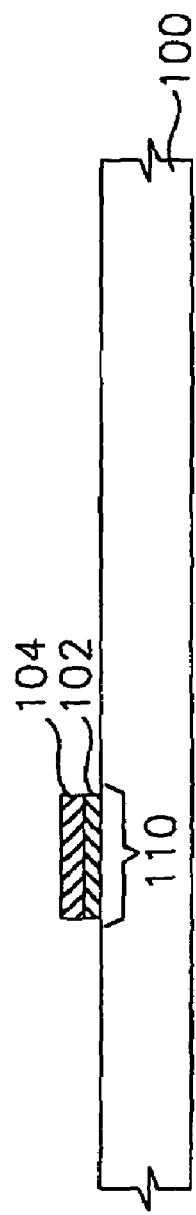
FIGS. 5A to 9B are cross-sectional views illustrating a method of manufacturing the reflection type liquid crystal display device shown in FIG. 4.
Figure 5B:
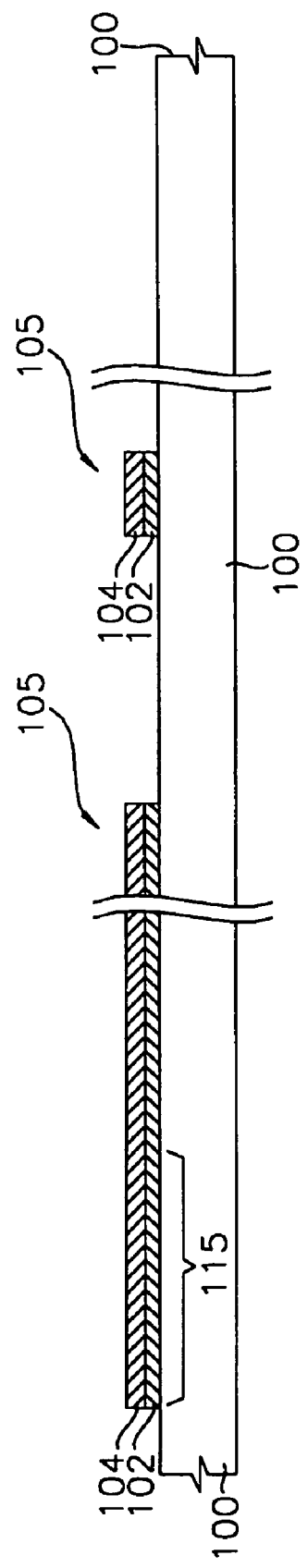

Referring to FIGS. 5A and 5B, after sequentially depositing a first metal layer 102 and a second metal layer 104 on an insulating substrate 100 comprised of glass, quartz or ceramic, these layers 104 and 102 are patterned by a photolithography process using a first mask to form a gate wiring. Preferably, the first metal layer 102 is comprised of chrome (Cr) having a thickness of about 500 Å and the second metal layer 104 is comprised of aluminum-neodymium (AlNd) having a thickness of about 2500 Å. The gate wiring includes a gate line 105 prolonged in a first direction, a gate electrode 110 of a thin film transistor branched from the gate line 105, and a gate terminal 115 connected to the end of the gate line 115.

Figure 6A:
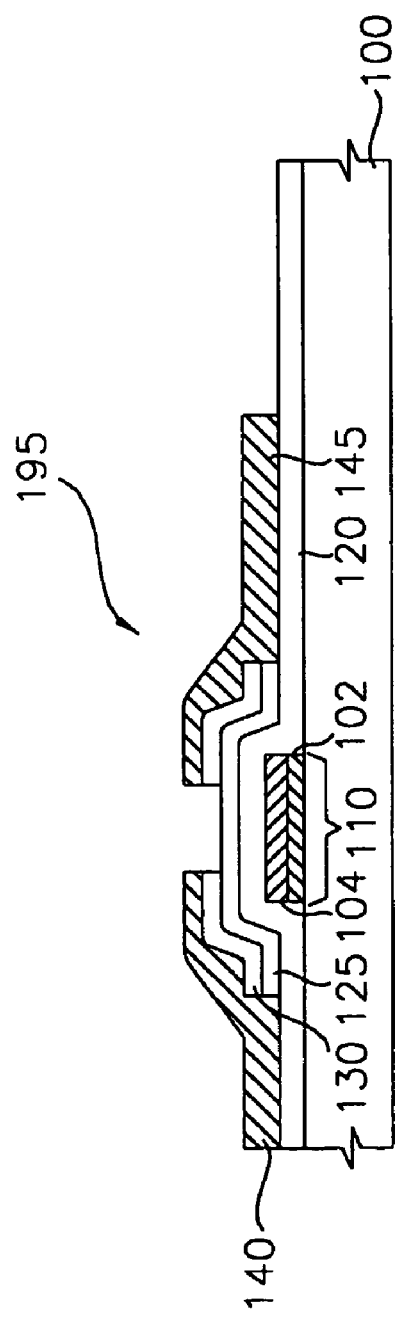
Figure 6B:
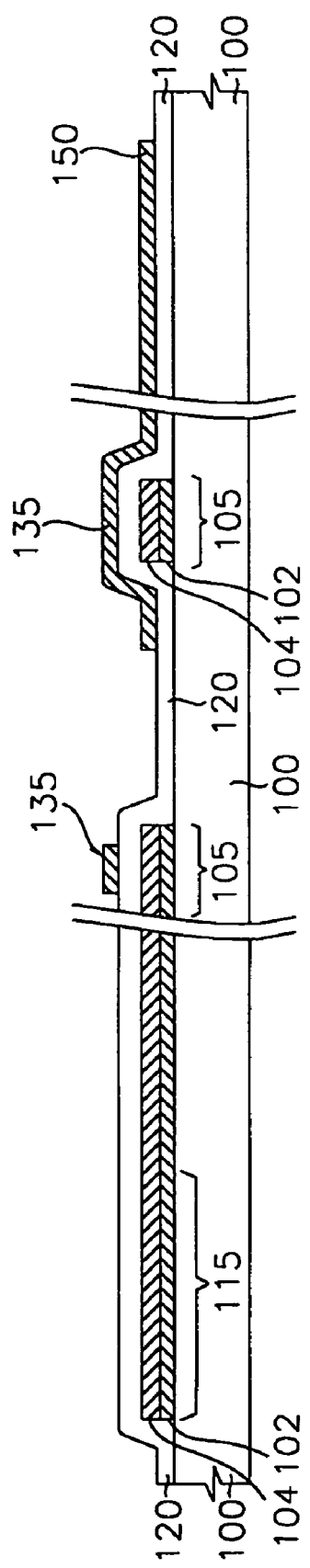

Referring FIGS. 6A and 6B, an inorganic material, e.g., silicon nitride, is deposited to a thickness of about 4500 Å by a plasma-enhanced chemical vapor deposition (PECVD) method on the substrate 100 on which the gate wiring is formed, thereby forming a gate insulating layer 120.

An active layer, e.g., an amorphous silicon layer, is deposited to a thickness of about 2000 Å by the PECVD method on the gate insulation layer 120, and then, an ohmic contact layer, e.g., an n$^+$ doped amorphous silicon layer, is deposited to a thickness of about 500 Å by the PECVD method on the active layer. Here, the active layer and the ohmic contact layer are in-situ deposited in the same chamber of the PECVD equipment. Next, the active layer and the ohmic contact layers are patterned by a photolithography process using a second mask to form an active pattern 125 and an ohmic contact pattern 130. The active pattern 125 remains on the gate insulation layer 120 where the gate electrode 110 is located.

Then, after depositing a metal layer such as chrome (Cr) a thickness of about 1500 to about 4000 Å on the ohmic contact pattern 130 and the gate insulation layer 120, the metal layer is patterned by a photolithography process using a third mask to form a data wiring. The data wiring includes a data line 135 perpendicular to the gate line 105, source/drain electrodes 140 and 145 branched from the data line 135, and a data terminal 150 connected to the end of the data line 135.

Subsequently, the ohmic contact pattern 130 exposed between the source electrode 140 and the drain electrode 145 is removed by a reactive ion etching (RIE) method, thereby forming the thin film transistor 195 on the display region (D). At that time, the gate insulation layer 120 is interposed between the gate line 105 and the data line 135, thereby preventing the gate line 105 and the data line 135 from making electrical contact with each other.

In the present embodiment, the active pattern 125, the ohmic contact pattern 130 and the data wiring are formed using two masks. The present inventors, however, invented and filed a method for forming an active pattern, an ohmic contact pattern and a data wiring using one mask as Korean Patent Application No. 1998-49710, thereby reducing the number of masks for manufacturing a thin film transistor-liquid crystal display device having the bottom-gate structure. The method of manufacturing such thin film transistor-liquid crystal display device will be described as follows using the same reference numerals concerning elements identical to the present embodiment.

At first, an active layer, an ohmic contact layer and a metal layer are successively deposited on a gate insulation layer 120. After a photoresist layer is coated on the metal layer, the photoresist layer is patterned by exposure and developing processes to form a photoresist pattern (not shown) including a first portion, a second portion, and a third portion. The first portion has a first thickness and locates on a channel region of the thin film transistor. The second portion has a second thickness thicker than that of the first portion and locates on a region where a data wiring will be formed. The third portion is a region where no photoresist layer remains.

Then, the metal layer, ohmic contact layer and active layer under the third portion, the metal layer under the first portion, and a partial thick of the second portion are etched away to simultaneously form the data wiring composed of the metal layer, the ohmic contact pattern 130 comprised of the n$^+$ amorphous silicon layer and the active pattern 125 comprised of amorphous silicon layer. Next, the remaining the photoresist patterns is removed. By doing so, the active pattern 125, the ohmic contact pattern 130 and the data wiring are formed at the same time using one mask.

Figure 7A:
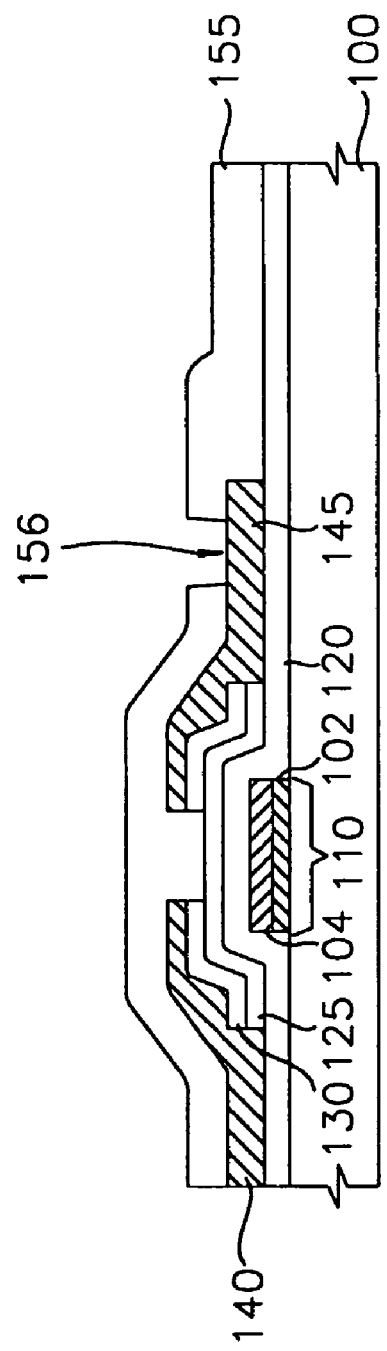

Referring to FIGS. 7A and 7B, an inorganic material, e.g., silicon nitride, is deposited to a thickness of about 2000 Å on the entire surface of the substrate 100 on which the thin film transistor 195 is formed, thereby forming a first passivation layer 155. The first passivation layer 155 assures reliabilities of the thin film transistor and the pads, and enhances the adhesion of integrated circuits during a subsequent COG bonding.

Next, through a photolithography process using a fourth mask, the first passivation layer 155 and the gate insulating layer 120 are etched away to form a first contact hole 156 exposing the drain electrode 145. At the same time, there are formed a first pad contact hole 160 exposing the gate terminal 115 and a portion of the gate line 105 connected to the gate terminal 115, and a second pad contact hole 175 exposing a portion of the data terminal 150. The first pad contact hole 160 is extended to the boundary region (B) located between the pad region (P) and the display region (D), while the second pad contact hole 165 is formed only on the pad region (P).

At this time, since the gate terminal 155 exposed through the first pad contact hole 160 is the second metal layer 104 comprised of aluminum-neodymium (AlNd), the entire exposed second metal layer 104 is etched away by a wet etching process using an aluminum etchant in order to prevent the aluminum layer from making direct contact with an ITO pad electrode that will be formed in a subsequent process. As a result, the gate terminal 115 and the first metal layer 104 that is a portion of the gate line 105 connected with the gate terminal 115 are exposed through the first pad contact hole 160. No galvanic corrosion is generated between the first metal layer 102 and the ITO pad electrode because the first metal layer 102 is comprised of chrome (Cr). When the second metal layer 104 comprised of aluminum-neodymium (AlNd) exposed by the first pad contact hole 106 is etched as described above, the side wall of the second metal layer 104 is etched due to the isotropic characteristic of the wet etching method, thereby forming an undercut 162.

Figure 8A:
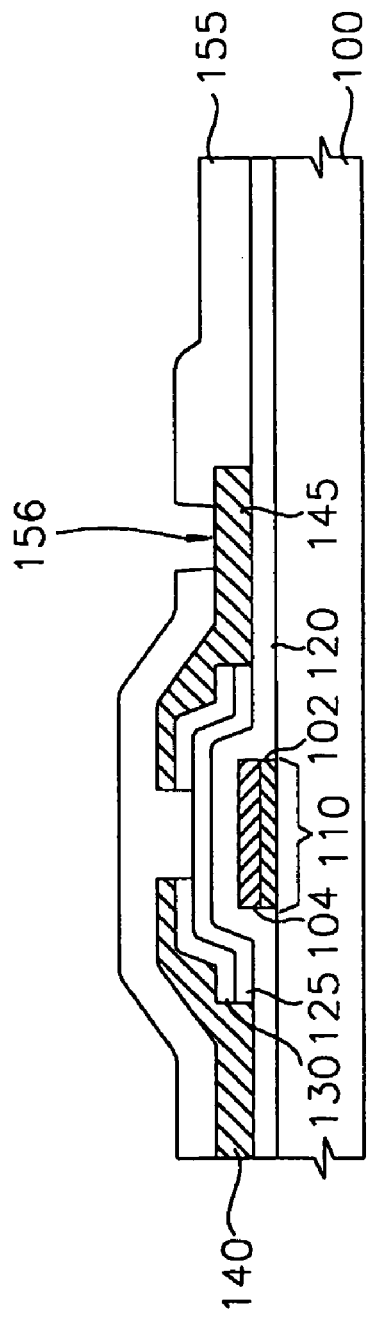
Figure 8B:
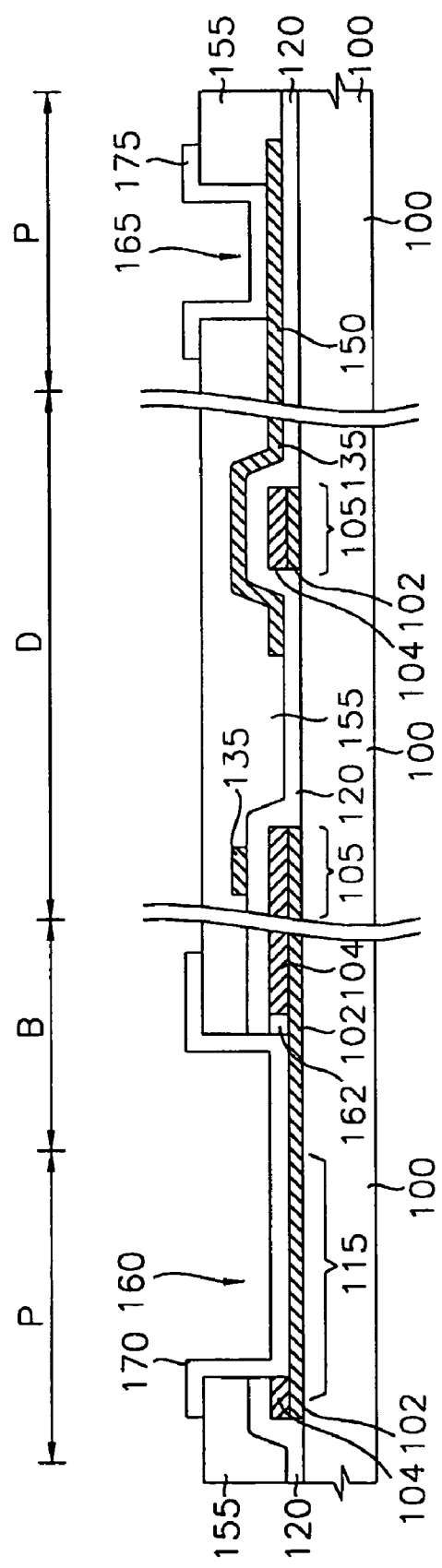

Referring to FIGS. 8A and 8B, a transparent conductive layer, preferably ITO layer, is deposited on the pad contact holes 160 and 165 and the first passivation layer 155, and then, patterned by a photolithography process using a fifth mask. By doing so, there is formed a gate pad electrode 170 being in contact with the gate terminal 115 and the first metal layer 102 of a portion of the gate line 105 connected to the gate terminal 115 through the first pad contact hole 160. At the same time, there is formed a data pads electrode 175 making contact with the data terminal 150 through the second pad contact hole 165.

In order to complete cover the first metal layer 102 exposed the first pad contact hole 160, the gate pad electrode 170 is formed so as to extend to the boundary region (B) between the pad region (P) and the display region (D). Accordingly, though chemicals penetrate through pinholes in the ITO layer constituting the gate pad electrode 170 to short-circuit the first metal layer 102, a redundancy can be formed by the gate pad electrode 170 covering the first metal layer 102 that is not short-circuited.

Figure 9A:
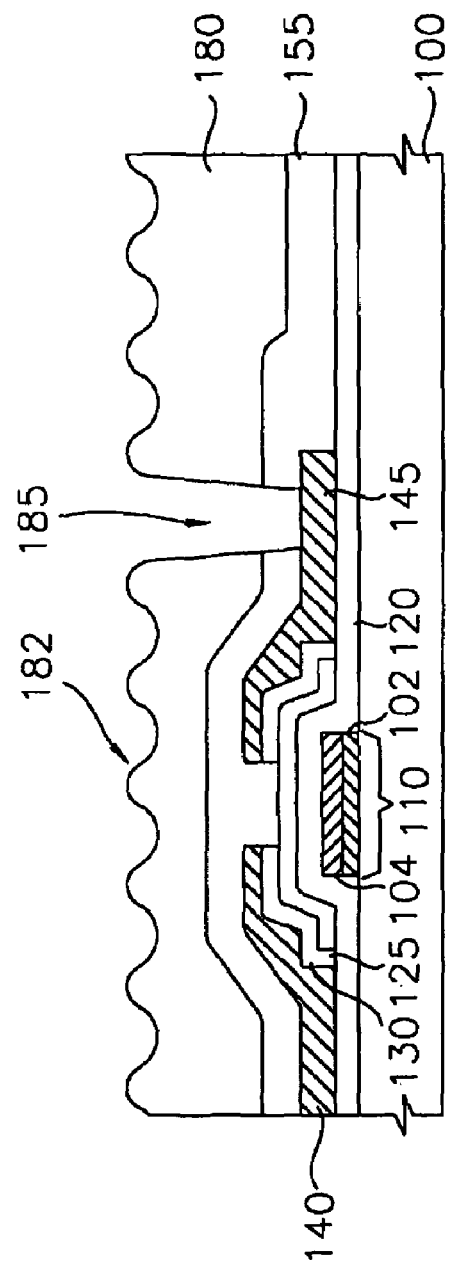
Figure 9B:
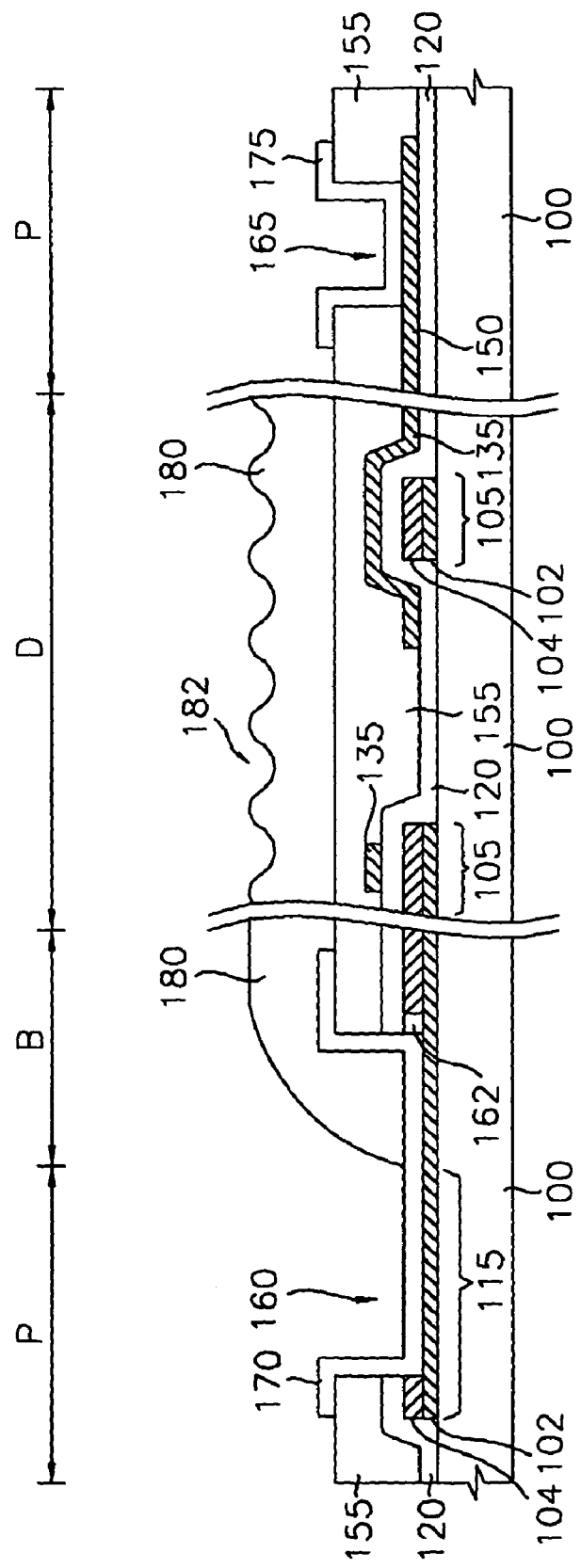

Referring to FIGS. 9A and 9B, an organic material having a low dielectric constant, e.g., a photosensitive acrylic resin, is coated to a thickness more than 2 μm on the gate pad electrode 170, the data pad electrode 175 and the first passivation layer 155, thereby forming a second passivation layer 180. Because the second passivation layer 180 restrains a parasitic capacitance that is generated between the data wiring and a pixel electrode, the pixel electrode, i.e., a reflective electrode, is formed so as to be overlapped with the gate line 105 and data line 135, thereby accomplishing the thin film transistor-liquid crystal display device having a high aperture ratio.

After a sixth mask having a pattern corresponding to a contact hole 185 is positioned over the second passivation layer 180 in order to form the contact hole 185 through the second passivation layer 180, a portion of the second passivation layer 180 over the drain electrode 145 and a portion of the second passivation layer 180 over the pad region (P) are primarily exposed by a full exposure process. Next, a seventh mask for forming micro lenses is positioned over the second passivation layer 180. A portion of the second passivation layer 180 over the display region (D) besides the contact hole 185 is secondarily exposed via a lens exposure process. Subsequently, a develop process is carried out using a solution including tetramethyl-ammonium hydroxide (TMAH) to thereby form the contact hole 185 and numerous grooves 182. The contact hole 185 extends from the first contact hole 156 to thereby expose the drain electrode 145. At this case, the second passivation layer 180 over the pad region (P) is removed.

Then, after performing a curing process at a temperature of about 130 to 230° C. for about 100 minutes in order to reflow and to harden the second passivation layer 180, an entire-etching process using an aluminum etchant is carried out for about a few minutes in order to enhance the pixel contact characteristics.

Next, a metal layer (not shown) having an etching rate similar to that of a reflective layer constituting the reflective electrode with respect to an etchant for etching the reflective layer, e.g., a molybdenum-tungsten (MoW), is deposited to a thickness of about 500 Å on the entire surface of the resultant structure, thereby forming a barrier metal layer (not shown). The reflective layer having a high reflectivity such as aluminum-neodymium (AlNd) or silver (Ag) is deposited to a thickness of about 1500 Å on the barrier metal layer. Next, the reflective layer and the barrier metal layer are patterned through a photolithography process using an eighth mask to thereby form the reflective electrode (reference numeral 190 in FIG. 4A). The reflective electrode 190 serves as a reflector and a pixel electrode, and is connected to the drain electrode 145 of the thin film transistor.

According to the present invention as described above, the pad electrode consisting of the transparent conductive layer is formed after an opening region of the first passivation layer, i.e., the pad contact hole, is formed so as to be extended to a position under the second passivation layer located on the boundary region between the display region and the pad region. By doing so, the second passivation layer covers a portion where the step coverage of the pad electrode is poor due to a stepped portion of the opening region, i.e., an undercut of the second metal layer. Therefore, it can be prevented chemicals from penetrating through the stepped portion of the opening region to cause a battery effect between the pad electrode and the second metal layer of the wiring layer, thereby preventing a lifting of the pad electrode and a corrosion of the second metal layer.

Further, the first metal layer of the wiring layer exposed through the pad contact hole is covered with the pad electrode to the boundary region located between the display region and the pad region. Thus, when the first metal layer of the wiring layer terminal is short-circuited on a predetermined region, a redundancy can be formed by the pad electrode covering the first metal layer that is not short-circuited.

Although the preferred embodiments of the present invention have been described, it is understood that the present invention should not be limited to these preferred embodiments but various changes and modifications can be made by one skilled in the art within the spirit and scope of the present invention as hereinafter claimed.

The invention claimed is:

1. A reflection type liquid crystal display device, comprising:
    a substrate including a display region, a pad region, and a boundary region between the display region and the pad region;
    a wiring layer formed on the substrate, the wiring layer comprising a first metal layer and a second metal layer stacked on the first metal layer, the wiring layer having a wiring layer terminal corresponding to the pad region;
    a first passivation layer formed on the substrate having the wiring layer, the first passivation layer having a pad contact hole that exposes the first metal layer corresponding to the wiring layer terminal and a portion of the wiring layer connected to the wiring layer terminal;
    a pad electrode continuously formed on a sidewall and a bottom of the pad contact hole and on a portion of the first passivation layer, the pad electrode comprising a transparent conductive layer and making contact with the first metal layer corresponding to the wiring terminal and a portion of the wiring layer connected to the wiring layer terminal;

a second passivation layer formed directly on the pad electrode corresponding to the boundary region and directly on the first passivation layer corresponding to the display region and the boundary region; and a reflective electrode formed on the second passivation layer corresponding to the display region;

wherein the pad contact hole extends to a position under the second passivation layer located on the boundary region.

2. The reflection type liquid crystal display device as claimed in claim 1, wherein the second metal layer of the wiring layer comprises aluminum (Al) or aluminum alloy.

3. The reflection type liquid crystal display device as claimed in claim 1, wherein the pad electrode is extended along the pad contact hole to the boundary region.

4. A reflection type liquid crystal display device, comprising:

a substrate including a display region, a pad region, and a boundary region between the display region and the pad region;

a gate wiring formed on the substrate, the gate wiring comprising a first metal layer and a second metal layer stacked on the first metal layer, the gate wiring having a gate line prolonged in a first direction and a gate terminal connected to an end of the gate line, the gate terminal corresponding to the pad region;

a gate insulating layer formed on the substrate having the gate wiring;

a data wiring formed on the gate insulating layer, the data wiring having a data line prolonged in a second direction substantially perpendicular to the first direction and a data terminal connected to an end of the data line, the data terminal corresponding to the pad region;

a first passivation layer formed on the substrate having the data wiring and the gate insulating layer, the first passivation layer having a first pad contact hole formed through the gate insulating layer to expose the first metal layer corresponding to the gate terminal and a portion of the gate line connected to the gate terminal;

a gate pad electrode continuously formed on a sidewall and a bottom of the first pad contact hole and on a portion of the first passivation layer, the gate pad electrode comprising a transparent conductive layer and making contact with the first metal layer corresponding to the gate terminal and a portion of the gate line connected to the gate terminal;

a second passivation layer formed directly on the gate pad electrode corresponding to the boundary region and directly on the first passivation layer corresponding to the display region and the boundary region; and a reflective electrode formed on the second passivation layer corresponding to the display region;

wherein the first pad contact hole extends to a position under the second passivation layer located on the boundary region.

5. The reflection type liquid crystal display device as claimed in claim 4, wherein the second metal layer of the gate wiring comprises aluminum or aluminum alloy.

6. The reflection type liquid crystal display device as claimed in claim 4, wherein the gate pad electrode is extended along the first pad contact hole to the boundary region.

7. The reflection type liquid crystal display device as claimed in claim 4, further comprising a data pad electrode formed from a same layer as in the gate pad electrode, the data pad electrode making contact with the data terminal via a second pad contact hole formed through the gate insulating layer and the first passivation layer over the data terminal.

8. The reflection type liquid crystal display device as claimed in claim 4, wherein the first passivation layer comprises an inorganic material and the second passivation layer comprises an organic material.

9. The reflection type liquid crystal display device as claimed in claim 4, wherein the second passivation layer has a contact hole exposing a portion of the data line over the display region.

10. The reflection type liquid crystal display device as claimed in claim 9, wherein the reflective electrode is connected to a portion of the data line over the display region through the contact hole.

11. A method of manufacturing a reflection type liquid crystal display device, the method comprising:

forming a wiring layer on a substrate including a display region, a pad region, and a boundary region between the display region and the pad region, the wiring layer comprising a first metal layer and a second metal layer stacked on the first metal layer, the wiring layer having a wiring layer terminal corresponding to the pad region;

forming a first passivation layer on the substrate having the wiring layer, the first passivation layer having a pad contact hole that exposes the first metal layer corresponding to the wiring layer terminal and a portion of the wiring layer connected to the wiring layer terminal;

continuously forming a pad electrode comprising a transparent conductive layer on a sidewall and a bottom of the pad contact hole and on a portion of the first passivation layer, the pad electrode making contact with the first metal layer corresponding to the wiring terminal and a portion of the wiring layer connected to the wiring layer terminal;

forming a second passivation layer directly on the pad electrode corresponding to the boundary region and directly on the first passivation layer corresponding to the display region and the boundary region; and forming a reflective electrode on the second passivation layer corresponding to the display region.

12. The method of manufacturing a reflection type liquid crystal display device as claimed in claim 11, wherein the second metal layer of the wiring layer comprises aluminum or aluminum alloy.

13. The method of manufacturing a reflection type liquid crystal display device as claimed in claim 11, wherein the step of forming the first passivation layer comprises:

forming the first passivation layer on the substrate having the wiring layer;

partially etching the first passivation layer to form the pad contact hole that exposes the second metal layer corresponding to the gate terminal and a portion of the wiring layer connected to the wiring layer terminal; and etching the exposed second metal layer to expose the underlying first metal layer.

14. The method of manufacturing a reflection type liquid crystal display device as claimed in claim 11, wherein the pad electrode is formed so as to be extended along the pad contact hole to the boundary region.

15. A method of manufacturing a reflection type liquid crystal display device, the method comprising:

forming a gate wiring on a substrate including a display region, a pad region and a boundary region between the display region and the pad region, the gate wiring comprising a first metal layer and a second metal layer stacked on the first metal layer, the gate wiring having a gate line prolonged in a first direction and a gate terminal connected to an end of the gate line, the gate terminal corresponding to the pad region;

forming a gate insulating layer on the substrate having the gate wiring;

forming a data wiring on the gate insulating layer, the data wiring having a data line prolonged in a second direction substantially perpendicular to the first direction and a data terminal connected to an end of the data line, the data terminal corresponding to the pad region;

forming a first passivation layer on the substrate having the data wiring and the gate insulating layer, the first passivation layer having a first pad contact hole formed through the gate insulating layer to expose the first metal layer corresponding to the gate terminal and a portion of the gate line connected to the gate terminal;

continuously forming a gate pad electrode comprising a transparent conductive layer on a sidewall and a bottom of the first pad contact hole and on a portion of the first passivation layer, the gate pad electrode making contact with the first metal layer corresponding to the gate terminal and a portion of the gate line connected to the gate terminal;

forming a second passivation layer directly on the gate pad electrode corresponding to the boundary region and directly on the first passivation layer corresponding to the display region and the boundary region; and forming a reflective electrode on the second passivation layer corresponding to the display region.

16. The method of manufacturing a reflection type liquid crystal display device as claimed in claim 15, wherein the second metal layer of the gate wiring comprises aluminum or aluminum alloy.

17. The method of manufacturing a reflection type liquid crystal display device as claimed in claim 15, wherein the step of forming the first passivation layer comprises:

forming the first passivation layer on the substrate having the data wiring;

partially etching the first passivation layer and the gate insulating layer to form the first pad contact hole that exposes the second metal layer corresponding to the gate terminal and a portion of the gate line connected to the gate terminal; and etching the exposed second metal layer to expose the underlying first metal layer.

18. The method of manufacturing a reflection type liquid crystal display device as claimed in claim 17, wherein a second pad contact hole exposing the data terminal is formed simultaneously in the step of forming the first pad contact hole.

19. The method of manufacturing a reflection type liquid crystal display device as claimed in claim 18, wherein a data pad electrode connected to the data terminal through the second pad contact hole is formed simultaneously in the step of forming the gate pad electrode.

20. The method of manufacturing a reflection type liquid crystal display device as claimed in claim 15, wherein the gate pad electrode is formed so as to be extended along the first pad contact hole to the boundary region.

21. The method of manufacturing a reflection type liquid crystal display device as claimed in claim 15, wherein the first passivation layer comprises an inorganic material and the second passivation layer comprises an organic material.

22. The method of manufacturing a reflection type liquid crystal display device as claimed in claim 15, wherein a contact hole exposing a portion of the data line in the display region is formed in the step of forming the second passivation layer.

* * * * *